United States Patent [19]
Woolley

[11] Patent Number: 5,166,501
[45] Date of Patent: Nov. 24, 1992

[54] FINANCIAL TRANSACTION CARDS HAVING TAGGING ELEMENT CAPABLE OF DEACTIVATION BY APPLICATION OF PERSONALIZING DATA

[75] Inventor: Robert A. Woolley, Uxbridge, England

[73] Assignee: Thorn Emi plc, London, England

[21] Appl. No.: 597,707

[22] Filed: Oct. 12, 1990

[30] Foreign Application Priority Data

Oct. 13, 1989 [GB] United Kingdom ............... 8923155

[51] Int. Cl.$^5$ ............... G06K 19/02; G06K 19/06; B42D 15/00; G08B 13/24
[52] U.S. Cl. .................... 235/488; 235/449; 235/487; 235/493; 283/82; 283/904; 340/551
[58] Field of Search ............... 235/488, 493, 449, 487, 235/432; 283/904, 82, 901; 340/551, 572

[56] References Cited

U.S. PATENT DOCUMENTS

| | | | |
|---|---|---|---|
| 4,044,231 | 8/1977 | Beck et al. | 235/493 |
| 4,058,839 | 11/1977 | Darjany | 235/493 |
| 4,104,513 | 8/1978 | Pearce | 235/450 |
| 4,260,881 | 4/1981 | Peterson | 235/493 |
| 4,342,904 | 8/1982 | Onsager | 235/493 |
| 4,581,524 | 4/1986 | Hoekman et al. | 235/493 |
| 4,626,311 | 12/1986 | Taylor | 340/572 |
| 4,682,154 | 7/1987 | Fearon et al. | 340/572 |
| 4,779,076 | 10/1988 | Weaver | 340/551 |
| 4,945,339 | 7/1990 | Yamauchi et al. | 340/551 |
| 4,956,636 | 9/1990 | Sansom et al. | 340/551 |

FOREIGN PATENT DOCUMENTS

| | | |
|---|---|---|
| 0297209 | 1/1989 | European Pat. Off. . |
| 0353040 | 1/1990 | European Pat. Off. . |
| 0354759 | 2/1990 | European Pat. Off. . |
| 2167627A | 5/1986 | United Kingdom . |
| 2210235A | 6/1989 | United Kingdom . |
| WO85/02285 | 5/1985 | World Int. Prop. O. . |

OTHER PUBLICATIONS

Patent Abstracts of Japan; vol. 6, No. 212, p. 151; JP 57-117129 Jul. 21, 1982.

Primary Examiner—John W. Shepperd
Assistant Examiner—Tan Nguyen
Attorney, Agent, or Firm—Keck, Mahin & Cate

[57] ABSTRACT

A financial transaction card 2, such as a check guarantee and/or credit card includes a tagging element 4 of a high permeability, low coercivity magnetic material, such as Ni Fe. The tagging element 4 is arranged in magnetic communication with a magnetic stripe 10 of relatively hard magnetic material or in a region of the card 2 used to record identifying data, such as user details, so as to be deactivated when the user details are recorded on the card 2. The provision of the element 4 enables card blanks to be monitored by an electronic article surveillance system during manufacture or prior to issue.

6 Claims, 2 Drawing Sheets

FINANCIAL TRANSACTION CARDS HAVING TAGGING ELEMENT CAPABLE OF DEACTIVATION BY APPLICATION OF PERSONALIZING DATA

The present invention relates to improvements in or relating to financial transaction cards.

Financial transaction cards, such as bank, credit or charge cards, are particularly vulnerable to fraudulent use if stolen before irreversible recordal of identifying data, such as recordal of the name of the card holder or account number. Manufacturers of such cards employ, therefore, very high levels of security within a manufacturing plant to ensure that card 'blanks' are not stolen. These security measures usually include continuous audits of the number of cards at each stage in the manufacturing process, which are both time consuming and costly. The present invention seeks to alleviate the problem of monitoring card blanks against theft during manufacture by the provision on or within the body of each card of a magnetic element, which is frequently referred to as a 'tag' or 'tagging element'. Unauthorised removal of a tagged card from a manufacturing or other secure area may then be detected by electronic article surveillance systems, which may operate on the principles used for retail magnetic tagging systems, installed at all access points to the area.

Accordingly, there is provided a financial transaction card comprising a substrate and a tagging element of relatively high permeability low coercivity magnetic material for detection by an electromagnetic surveillance system, the tagging element being arranged for deactivation when the card is arranged to bear card identifying data.

Preferably, the tagging element comprises a NiFe alloy which is positioned to underlie a region of the card which is embossed with identifying data such that the tagging element is deactivated by embossing of the identifying data or, alternatively, to underlie a high coercivity magnetic component provided on the card for recording the card identifying data such that the tagging element is deactivated by recordal of the data on or within the magnetic component.

Additionally, the present invention also provides a method for tagging financial transaction cards prior to the recordal thereon of card identifying data, the method comprising providing a financial transaction card with a tagging element of relatively high permeability low coercivity magnetic material for detection by an electromagnetic surveillance system, and deactivating the tagging element when the card is arranged to bear the card identifying data.

The present invention will now be described, by way of example, with reference to the accompanying drawings, in which.

Figure 1:
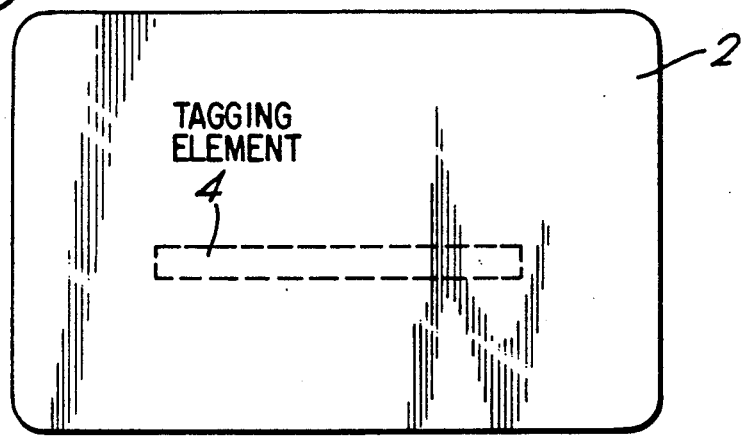
FIG. 1 illustrates a schematic plan view of a card incorporating a tagging element in accordance with one embodiment of the present invention.
Figure 2:
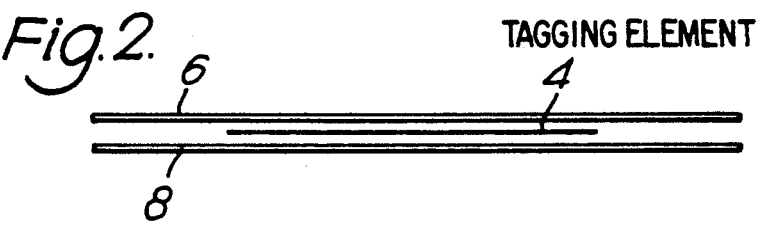
FIG. 2 illustrates a schematic side view of the layer structure of the card shown in FIG. 1.

Referring to FIG. 1, a financial transaction card 2 is provided with a tagging element 4 in the form of a thin foil of a high permeability, low coercivity magnetic material, such as a thin film of NiFe alloy deposited on a polyester substrate. The card 2 may be fabricated as a laminate structure from two sheets 6, 8 of suitable plastics material, such as PVC, with the tagging element 4 disposed between the sheets 6 and 8, as shown in FIG. 2. The arrangement shown in FIG. 2 may be laminated together to form the card by any suitable heated press as is well known in the art.

Figure 3:
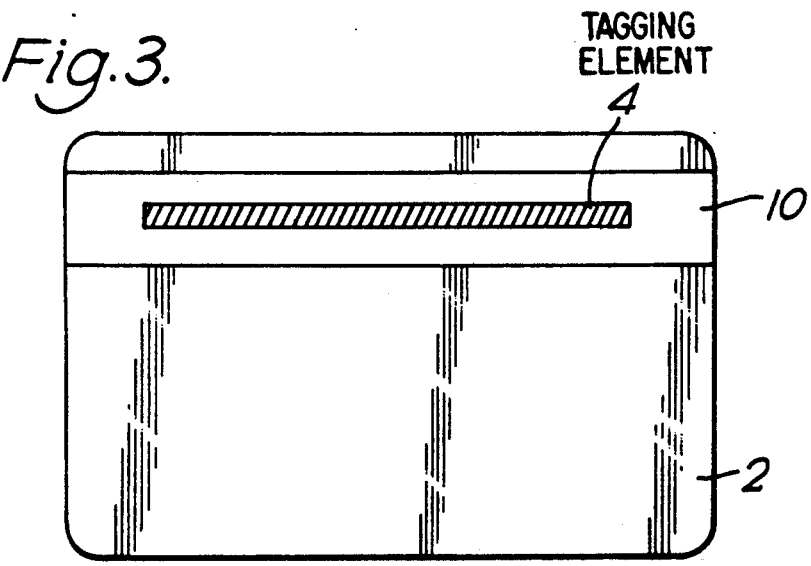
FIG. 3 illustrates a schematic plan view of a card incorporating a tagging element located under a stripe of relatively hard magnetic material in accordance with a further embodiment of the present invention.

FIG. 3 shows an alternative embodiment of the present invention in which the card 2 is also provided with a magnetic component in the form of a stripe 10 of low permeability high coercivity magnetic material which may be used to record card identifying data, such as user details, and which is arranged to overlie the tagging element 4. Preferably, the high permeability tagging element is made narrower than the stripe 10, which is typically a particulate magnetic coating of about 330 Oe coercivity, and is aligned with one or more of the data tracks of the stripe 10.

The dimensions of the high permeability tagging element 4 are chosen to provide a relatively low magnetic demagnetising factor when magnetised in one direction and the easy axis of magnetisation of the tagging element 4 is made to lie in this same direction. This easy axis of magnetisation may be achieved by the application of a suitably orientated d.c. magnetic field when the NiFe alloy is deposited on the polyester substrate. The NiFe alloy may comprise, typically, 80% Nickel 20% Iron and be in the form of a long thin narrow strip approximately 1 micron thick, and 2 to 4 mm width which may extend the entire or a predetermined portion of the length of the card.

Figure 4:
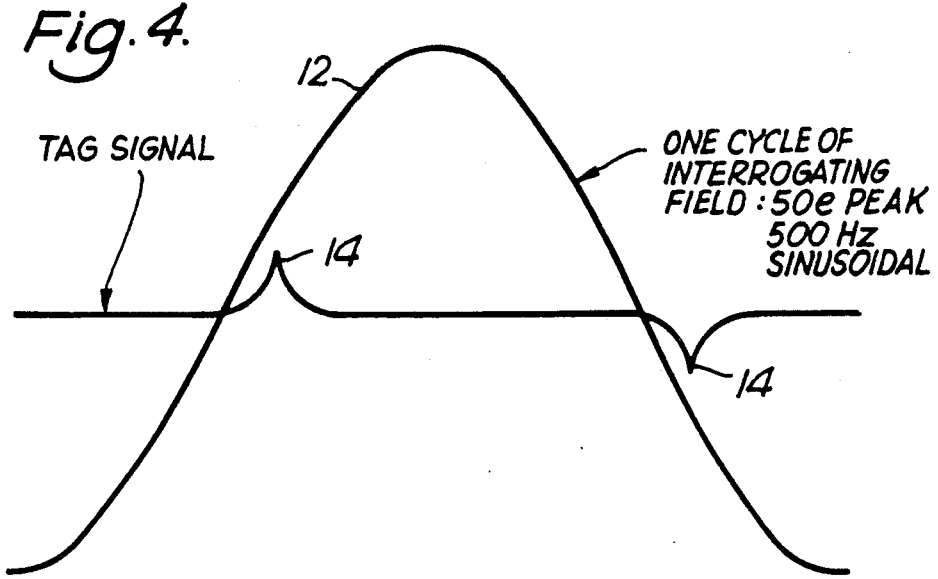
FIG. 4 illustrates the characteristic signal pulses generated by the card shown in FIG. 1 when interrogated by an alternating current magnetic field.

When the card 2 is passed into an area monitored by electronic article surveillance (EAS) equipment, such as by attempted theft, it is interrogated by an alternating current magnetic field, one cycle of which is shown by the trace 12 in FIG. 4, which in the example shown has a peak magnetic field strength of approximately 400 amperes/meter (5 oersteds) and a frequency of 500 Hz. The tagging element 4 present in the card causes a tag signal, consisting of characteristic sharp pulses 14, to be generated by the sense coils of the EAS equipment. The pulses 14 are used to activate an alarm indicating that a tagged card 2 is present in the monitored area, the characteristic shape of the pulses 14 enabling the EAS equipment to distinguish the tagged card from everyday metallic items passing through the area, thereby minimising false alarms.

When the card 2 is issued to a user it is undesirable for the high permeability tagging element 4 to remain active as spurious alarms could occur when a tagged card was carried legitimately through the monitoring area of a retail magnetic tagging system. The tagging element 4 can be deactivated in a number of ways. For example, the plastics sheets 6, 8 used to form the card substrate may be deformed in the region thereof overlying the tagging element 4. The localised displacement of the plastics material breaks up the high permeability tagging element 4 into a number of smaller magnetically polarised elements.

Figure 5:
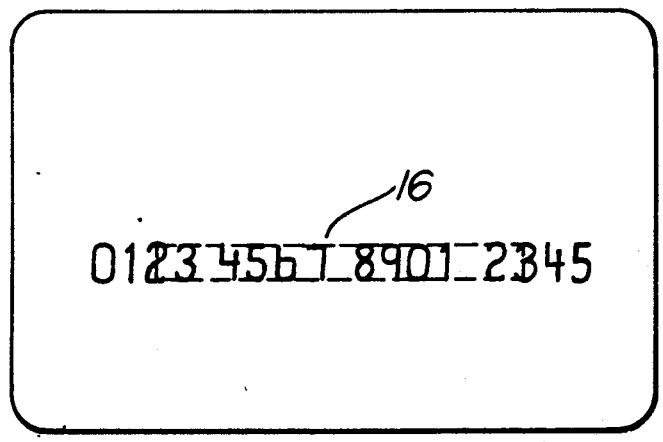
FIG. 5 is a schematic plan view of a card incorporating a tagging element which has been deactivated by overlaid embossing of card issue details.

In a preferred method of deactivation by deformation this is achieved by arranging the tagging element 4 in a region of the card which is used for recording card identifying data, such as embossing of user name, account number or card number; as indicated by reference numeral 16 in FIG. 5.

Figure 6:
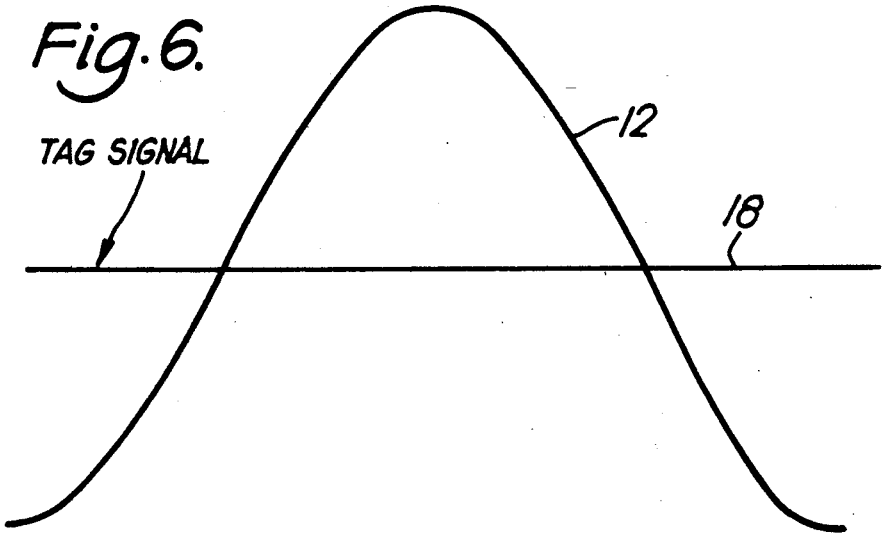
FIG. 6 illustrates the signal pulse generated by the card shown in FIG. 5 when interrogated by an alternating current magnetic field.

When embossed with data as shown in FIG. 5, the break up of the tagging element 4 into a number of smaller elements results in a greatly increased demagnetising factor so that when the card is interrogated by the a.c. magnetic field 12, a tag signal 18 of the form shown in FIG. 6 is generated, i.e. the characteristic sharp pulses 14 are no longer generated by the sense coils of the EAS equipment. As the sharp pulses 14 are not sensed, the alarm is not activated, and hence the card 2 is permitted to pass unhindered through the monitored area. Embossing, therefore, deactivates permanently the card tagging element 4.

Alternatively, with the arrangement shown in FIG. 3, the tagging element 4, being located so as to underlie the stripe 10, is arranged in magnetic communication with the stripe 10. The identifying data, which preferably is recorded magnetically onto the stripe 10 when the card is issued, produces a pattern of alternating north and south magnetic poles along the length of the high permeability tagging element 4, thereby deactivating the tagging element 4.

It will be realised that, with the embodiment shown in FIG. 3, the tagging element 4 can be reactivated by deletion of the user details from the hard magnetic stripe 10. This reactivation of the tagging element can be particularly advantageous if, for example, cards are returned by users to a bank as, the tag can be readily reactivated at the bank enabling the cards to once again be monitored against theft.

In order to make the tagging element 4 insensitive to bending of the card 2, the NiFe alloy may be deposited on a polyester substrate in a manner such that it has an inherent benign strain which has minimal effect on permeability but which is larger than any detrimental strain that the card 2 is expected to experience prior to deactivation of the tagging element 4 by selective deformation of the sheets 6, 8. Examples of methods for manufacturing tagging elements with benign strains are disclosed in U.S. Pat. No. 5,037,669.

In order to simplify manufacture of the cards 2, the high permeability tagging element 4 may be deposited onto one surface of the sheets 6, 8 and not onto an intermediary polyester film, as previously described. With NiFe alloy this could be achieved by electroless deposition of a current carrying strike layer, e.g. a layer of copper followed by electrodeposition of the NiFe alloy.

Figure 7:
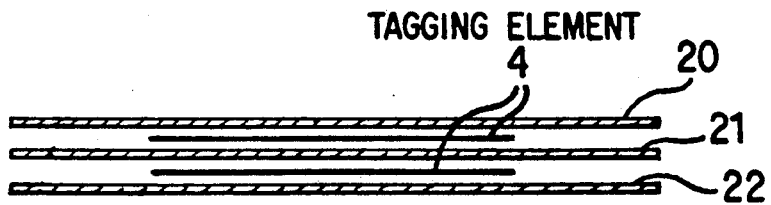
FIG. 7 illustrates a schematic side view of the further tagging element.

Alternatively, the card 2 may comprise a laminate of three sheets 20-22 of plastics material, such as PVC, with high permeability tagging elements 4 deposited on both sides of the central PVC sheet 21 (see FIG. 7). This particular arrangement would be particularly advantageous if the high permeability magnetic material used to form the tagging element was magnetostrictive, as at least one of the high permeability tagging elements 4 would still produce the characteristic sharp signal pulses 14 in the sense coils of the EAS equipment even if the laminated card was subjected to bending.

The tagging element 4 may also be fabricated by depositing a film of the NiFe alloy onto a release layer carried by a thin polyester base. Subsequently, the NiFe film may be peeled from the polyester base, enabling the tagging element thickness to be made extremely small, typically about 1 micron, making such elements particularly suitable for location, in the embodiment shown in FIG. 3, on an outer surface of the PVC sheets 6 or 8 and underlying the hard magnetic stripe 10. To assist manufacture of cards embodying such extremely thin tagging elements the NiFe film may be provided with an overlying adhesive layer which is used to adhere the NiFe film, whilst still bonded to the polyester base, to a surface of the PVC sheets 6 or 8. The polyester base may then be separated from the NiFe film, providing the very thin tagging element on the card. Additionally, the release layer may be arranged not only to permit the separation of the NiFe film, carrying the release layer, from the polyester base but also to serve as an adhesive for the exposed surface for the NiFe film, thereby facilitating the adhesion of subsequently deposited layers, e.g. the magnetically hard stripe 10, to the tagging element 4.

The tagging element 4 can, therefore, be readily incorporated into financial cards, either located on a surface of or between the PVC sheets 6, 8, using existing manufacturing techniques.

Although the present invention has been described with reference to specific embodiments, it is to be understood that modifications may be effected whilst remaining within the scope of the invention. For example, the invention has been described with reference to laminated card structures with the tagging element 4 disposed between the plies of the laminate. Equally, the card 2 may comprise a single sheet of deformable material with the tagging element supported on either the front or rear surface of the sheet.

Furthermore, the tagging element has been described in the form of a relatively long narrow strip. As the film of high permeability magnetic material is of approximately 1 micron thickness, the length and width of the film will invariably be large in comparison to the thickness. Hence other shapes of tagging element may be utilised whilst maintaining the desired magnetic profile for the tagging element 4.

I claim:

1. Card stock for use, when personalized, as a financial transaction card comprising a first sheet of plastics material and a tagging element construted and dimensioned to interact with interrogating signals projected into a region by an electronic article surveillance system to cause the generation of characteristic response signals for derivation of an alarm indication from said response signals if the card stock is present in said region, the tagging element being supported by the first sheet and positioned thereon to be juxtaposed with an area of the card that will bear personalizing data; the application of the personalizing data to said area deactivating the tagging element, thus preventing the card, when personalized, from interacting with said interrogating signals to cause the generation of said characteristic response signals.

2. Card stock according to claim 1, wherein said first sheet of plastic material supporting said tagging element is laminated to a second sheet of plastics material with said tagging element sandwiched between said first and said second sheet.

3. Card stock according to claim 1, wherein said first sheet supporting said tagging element is laminated to second and third sheets of plastics material and sandwiched therebetween, said tagging element being sandwiched between said first sheet and one of said second or third sheets.

4. Card stock according to claim 3, wherein said first sheet supports a further tagging element sandwiched between said first sheet and the other of said second or third sheets.

5. Card stock according to claim 1, wherein said personalizing data is applied to said area by embossing and such embossing breaks up said tagging element to effect deactivation thereof.

6. Card stock according to claim 1, including a strip of magnetizable material, secured to said area, for receiving said personalizing data; the tagging element being in magnetic communication with said strip causing personalizing data recorded in said strip to deactivate said tagging element.

* * * * *